(12) United States Patent
Yun (10) Patent No.: US 8,983,444 B2
(45) Date of Patent: Mar. 17, 2015

(54) METHOD FOR CONTROLLING PORTABLE DEVICE BY USING HUMIDITY SENSOR AND PORTABLE DEVICE THEREOF

(71) Applicant: Samsung Electronics Co., Ltd., Gyeonggi-do (KR)

(72) Inventor: Sangwon Yun, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/869,282

(22) Filed: Apr. 24, 2013

(65) Prior Publication Data
US 2014/0141761 A1 May 22, 2014

(30) Foreign Application Priority Data
Nov. 21, 2012 (KR) .................. 10-2012-0132221

(51) Int. Cl.
*H04M 3/00* (2006.01)
*H04W 8/22* (2009.01)
*H04M 1/02* (2006.01)
*H04M 1/725* (2006.01)

(52) U.S. Cl.
CPC ............... *H04W 8/22* (2013.01); *H04M 1/026* (2013.01); *H04M 1/72569* (2013.01); *H04M 1/72577* (2013.01); *H04M 2250/04* (2013.01)
USPC ........ 455/418; 455/566; 455/550.1; 455/574; 455/556.1

(58) Field of Classification Search
CPC ..................... H04M 1/72569; H04M 1/72577
USPC ................... 455/418, 566, 550.1, 574, 556.1
See application file for complete search history.

(56) References Cited

U.S. PATENT DOCUMENTS

| | | | |
|---|---|---|---|
| 2011/0003614 A1* | 1/2011 | Langereis et al. | 455/550.1 |
| 2011/0178613 A9* | 7/2011 | Bonnat | 700/83 |
| 2012/0270611 A1 | 10/2012 | Choi et al. | |
| 2014/0004908 A1* | 1/2014 | Park et al. | 455/566 |
| 2014/0055346 A1* | 2/2014 | Boni et al. | 345/156 |

FOREIGN PATENT DOCUMENTS

WO 2005/101176 A2 10/2005

* cited by examiner

*Primary Examiner* — Barry Taylor
(74) *Attorney, Agent, or Firm* — Cha & Reiter, LLC (57) ABSTRACT

A method of controlling a portable device having a humidity sensor is provided. The method includes measuring a humidity level around the portable device using the humidity sensor when a call event occurs, comparing the measured humidity level with a preset threshold value, and controlling on/off of a display unit of the portable device according to a comparison outcome.

16 Claims, 8 Drawing Sheets

METHOD FOR CONTROLLING PORTABLE DEVICE BY USING HUMIDITY SENSOR AND PORTABLE DEVICE THEREOF

CLAIM OF PRIORITY

This application claims, pursuant to 35 U.S.C. §119(a), priority to and the benefit of the earlier filing date of a Korean Patent Application filed in the Korean Intellectual Property Office on Nov. 21, 2012 and assigned Serial No. 10-2012-0132221, the contents of which are herein incorporated by reference.

BACKGROUND OF THE INVENTION

1. Field of the Invention

The present invention relates to a method of controlling an on/off mode of a display during a call connection using a humidity sensor, and a portable device thereof.

2. Description of the Related Art

A portable device such as a smart phone has various functions such as camera, music, game, voice and data voices, Internet, etc., and which in turn increases the power consumption. Hence, a function for reducing power consumption by minimizing unnecessary operations occurring operation of the portable device is highly desired.

One way to reduce power consumption is to automatically turn off the display unit when a user is not looking at the display unit or when no input occurs during a preset period of time. Further, a proximity sensor may be used to detect the presence of a user's face in relation to the display unit for monitoring purpose.

However, according to the conventional display unit control method, the range of recognizing the human body by the proximity sensor is not accurate, for example, due to dusts on the sensor, so the body part may be not recognized accurately which in turn may cause a wrong operation to occur. Further, in the case in which the display unit turned off when an input does not occur for a certain period of time, the power is still consumed, and thus the power consumption is not efficiently reduced even when the display unit turned off.

SUMMARY OF THE INVENTION

The present invention has been made in view of the above problems and provides additional advantages, by providing a method of controlling a portable device using a humidity sensor which controls on/off of a display unit based on a change of humidity using the humidity sensor, and the portable device thereof.

Further, another aspect of the present invention is to provide a method of controlling a portable device using a humidity sensor which shares an opening with a microphone on a printed circuit board (PCB) of the portable terminal, and the portable terminal thereof.

In accordance with an aspect of the present invention, a method of controlling a portable device having a humidity sensor includes: measuring a variation in a humidity level around the portable device when a call event occurs and when performing a call connection; comparing the measured variation with a preset threshold value; and selectively controlling on/off of a display unit of the portable device according to a comparison outcome, wherein the display unit is turned off when the measured variation is greater than or equal to the preset threshold value, and turned on when the measured variation is smaller than the preset threshold value.

In accordance with another aspect of the present invention, a portable device having a display unit includes: a humidity sensor for measuring a variation of a humidity level around the portable device when a call event occurs and when performing a call connection; and a controller for controlling the humidity sensor to measure the humidity level around the portable device, comparing the measured variation with a preset threshold value, and selectively controlling on/off of the display unit according to comparison outcome, wherein the controller controls the display unit to be turned off when the measured variation is greater or equal the present threshold value and turned on when the measured variation is less than the preset threshold value.

BRIEF DESCRIPTION OF THE DRAWINGS

The above features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

The present invention may be applied to a control of a portable device including a humidity sensor. However, it should be noted that the teachings of the present invention may be applicable to any duplex systems or other devices having a humidity sensor such as a smart phone, a portable terminal, a mobile terminal, a personal digital assistant (PDA), a portable multimedia player, a notepad, a Wibro terminal, etc.

Figure 1:
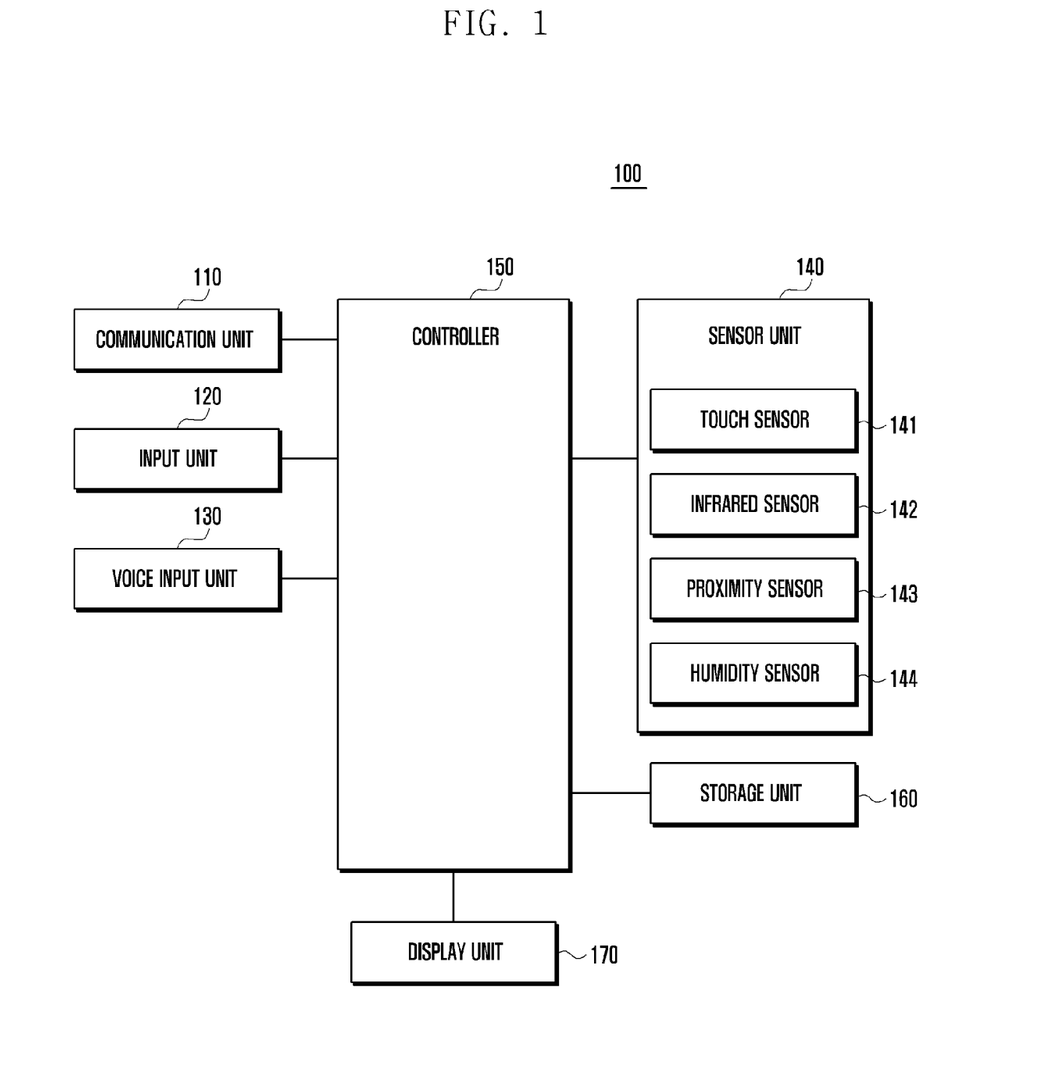
FIG. 1 is a block diagram illustrating a configuration of a portable device according an exemplary embodiment of the present invention.

FIG. 1 is a block diagram illustrating a configuration of a portable device according to an exemplary embodiment of the present invention.

Referring to FIG. 1, a portable terminal 100 may include a communication unit 110, an input unit 120, a voice input unit 130, a sensor unit 140, a controller 150, a storage unit 160, and a display unit 170.

In operation, the communication unit 110 transmits and receives a wireless signal to and from at least one of a base station, an external portable device and a server. Here, the wireless signal may include various forms of data according to transmission and reception of a voice call signal, a video call signal, or a text/multimedia message.

The input unit 120 senses user's input, and transmits an input signal corresponding to user's input to the controller 150. The input unit 120 may include a keypad, a dome switch, a touch pad (static voltage/static current), a jog wheel, a jog switch, a finger mouse, a wheel, etc.

The input unit 120 may be formed as an input pad. To this end, the input unit 120 may be configured in a form in which various sensors of the sensor unit 140 are mounted in the input unit 120. For example, the input unit 120 may be configured in a manner that a touch sensor 141 is attached on the input pad in a form of a film, or is coupled in a panel form. Further, the input unit 120 may be formed as an electro magnetic resonance (EMR) or electromagnetic interference (EMI) type input pad.

Alternatively, the input unit 120 may operate as an input screen by forming a layer structure with the display unit 170. For example, the input unit 120 may be formed as a touch screen panel (TSP) which includes an input pad including the touch sensor 141 and is coupled with the display unit 170. The input unit 120, which forms a layer structure with the display unit 170, may comprise a touch screen.

According to an exemplary embodiment of the present invention, the input unit 120 may sense user's input for a call execution and other voice and data functions.

The voice input unit 130 is for an input of an audio signal, and may include a microphone, etc. The microphone receives external audio signals and processes the signals as electronic voice data at a recording mode or a voice recognition mode. The voice data processed during a calling mode may be transmitted to the base station through the communication unit 110.

The sensor unit 140 includes a plurality of sensors for sensing the current state of the portable device 100. The sensor unit 140 may generate a control signal corresponding to the sensed state, and transmit the generated signal to the controller 150. The sensor unit 140 may include a touch sensor 141, an electromagnetic sensor 142 and a proximity sensor 143 and a humidity sensor 144.

The touch sensor 141 may sense user's touch input. The touch sensor 141 may be formed of, for example, a touch film, a touch sheet, a touch pad, etc. The touch sensor 141 may sense a touch input and transmit the sensed touch signal to the controller 150. The controller 150 may analyze the touch signal and perform an operation corresponding to the touch signal. Further, the information corresponding to the sensed touch signal may be displayed on the display unit 170. The touch sensor 141 may receive a manipulation signal by a user's touch input by various input means. The touch sensor 141 may receive an input of a manipulation signal by a user' body (e.g., a hand), a physical tool, a stylus pen, and a manipulation button which may be included in the stylus pen. The touch sensor 141 may sense a proximity input within a certain distance as well as a direct touch input. The touch sensor 141 may be coupled with the input unit 120 so as to be formed of a touch pad type, and may detect a user's touch input through the input unit 120.

The electromagnetic sensor 142 may sense a touch or proximity input according to the change of the intensity of the electromagnetic field, and may be constituted as an input pad form of an electromagnetic resonance (EMR) or electromagnetic interference (EMI) scheme. The electromagnetic sensor 142 may include a coil which induces the electromagnetic field, and may sense an approach of an object including a resonant circuit which causes an energy change of the electromagnetic field which has occurred in the electromagnetic sensor 142. The electromagnetic sensor 142 includes a resonant circuit, and may sense an input by a stylus pen, etc.

The proximity sensor 143 may sense an existence, approach, direction, speed, form, etc. of an object, which occurs on the detection surface of the input unit 120, without a mechanical contact using the force of the electromagnetic field. The proximity sensor 143 may be one of a transmitting photoelectric sensor, a mirror reflective photoelectric sensor, a high frequency oscillation type proximity sensor, a capacitance type proximity sensor, a magnetic type proximity sensor, and an infrared ray proximity sensor.

According to an exemplary embodiment of the present invention, the proximity sensor 143 may be arranged on the front surface of the portable device 100 to sense an approach of a human body part to the portable device 100. For example, when user makes the portable device 100 approach his face to perform a call, the proximity sensor 143 may sense that the portable device 100 nears the user's face or head portion area (or vice versa) during a call connection mode. Note that the call connection mode represents a mode when the user initiates a call connection or receives an incoming call.

In response, the proximity sensor 143 may generate a corresponding control signal and transmit the control signal to the controller 150.

Also, the humidity sensor 144 measures the amount of moisture contained in the air around the humidity sensor 144, generates a control signal including information on the measured value, and transmits the generated signal to the controller 150. The humidity sensor 144 may be formed as a resistive type or capacitance type semiconductor system humidity sensor. It should be noted that the proximity sensor 143 and the humidity sensor 144 can operate simultaneously or independently, or operates a back-up for each other in the event one of the sensors malfunctions.

The humidity sensor 144 may be mounted on the substrate provided inside of the portable device 100. In the embodiment of the present invention, in order to sense the change of humidity by user's steam of breath during a call connection, the humidity sensor 144 may be formed to share one opening connected to the outside with the voice input unit 130.

Figure 2:
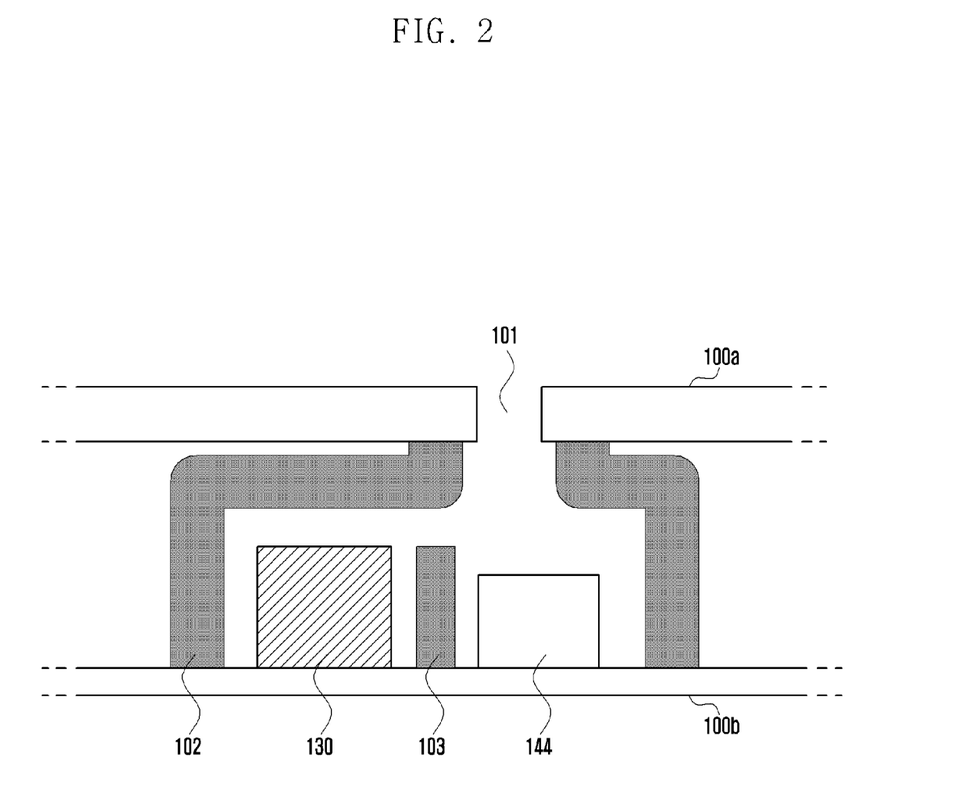
FIG. 2 illustrates an example of an arrangement of a humidity sensor inside the portable device according an exemplary embodiment of the present invention.

For example, referring to FIG. 2, the humidity sensor 144 may be installed on a substrate 100b mounted inside the portable device 100. The substrate 100b allows each component of the portable device 100 to be fixed so as to be normally operated. The substrate 100b and each component installed on the substrate 100b may be surrounded by the case 100a of the portable device 100. In order to block foreign substances from the outside, the case 100a may surround the substrate 100b and each component installed on the substrate 100b, and an interface, such as the input unit 120, the voice input unit 130, a camera, etc. may be installed depending on the implemented scheme.

The humidity sensor 144 may be installed adjacent to the voice input unit 130 on the substrate 100b. As such, in case the user makes the portable device 100 approach his face to perform a call, or inputs a voice through the voice input unit 130 during a call, the humidity sensor 144 may sense a change of humidity by the moisture contained in the user's steam of breath.

A hole 101 (or opening) is formed in the case 100a adjacent to the substrate 100b on which the humidity sensor 144 and the voice input unit 130 are installed. The hole allows the air to flow in and out of the portable device 100, and the vibration of the air according to the external air or user's voice may be transmitted to the humidity sensor 144 and the voice input unit 130 through the hole 101. The hole 101 may be formed on a surface facing the substrate 100b on the case. Further, the hole 101 may be formed on a surface facing the side surface of the substrate in the case 100a.

The humidity sensor 144 and the voice input unit 130 may be surrounded by a holder 102. The holder 102 connects a space between the substrate 100b and the case 100a so as not to have a gap between the substrate 100b and the case 100a. Further, the air, which flows through the hole 101, may not be dispersed by forming a closed space for the humidity sensor 144 and the voice input unit 130 in the portable device 100.

Figure 3:
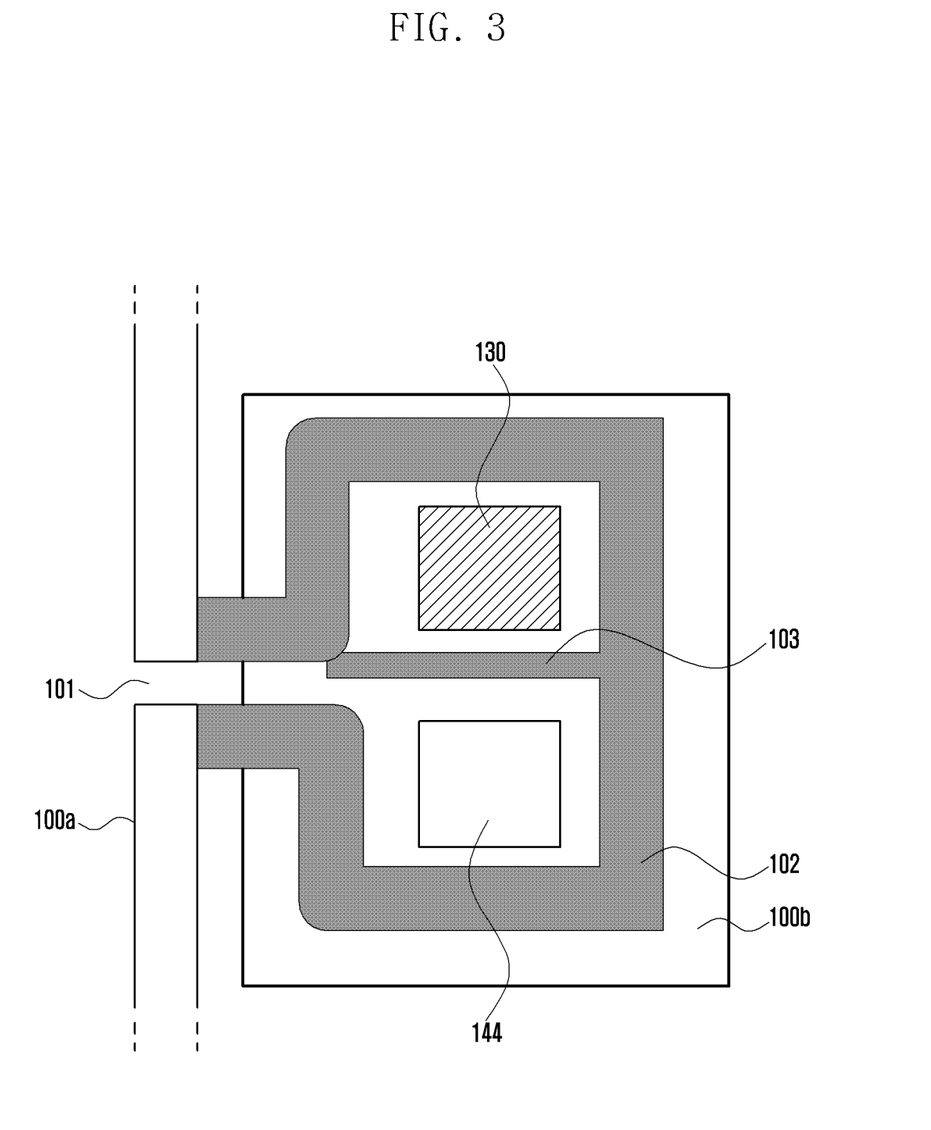
FIG. 3 illustrates another example of an arrangement of a humidity sensor inside the portable device according an exemplary embodiment of the present invention.

Further, referring to FIG. 3, a wall 103 may be formed between the humidity sensor 144 and the voice input unit 130 in alternate embodiment. The wall 103 separates the space for the humidity sensor 144 from the space for the voice input unit 130, and separates the air flown into the humidity sensor 144 from the air flown into the voice input unit 130 so that an error due to a mutual influence may be prevented.

Further, the sensor unit 140 may include at least one of a motion sensor, a pressure sensor, a temperature sensor, a tension sensor, an electric current sensor, a tactile sensor, and a tilt sensor, and may sense the state of the portable device 100.

The controller 150 may control each component for the overall operation of the portable device 100. For example, the controller 150 may control on/off of the display unit 170 based on the change of the humidity sensed through the humidity sensor 144.

According to an exemplary embodiment of the present invention, when a call event occurs, the controller 150 controls the humidity sensor 144 to measure the surrounding humidity level of the portable device 100, compares a variation in the measured humidity with a preset threshold when a call event occurs and when a call connection in progress, and selectively controls on/off of the display unit 170 according to the comparison outcome.

Programs or commands for the portable device 100 may be stored in the storage unit 160. The controller 150 may perform programs or commands stored in the storage unit 160. The specific operation of the controller 150 will be described below in detail with reference to the drawings.

The storage unit 160 may include at least one of storage media such as a flash memory, a hard disk drive, a multimedia card micro type memory, a card type memory (e.g., SD or XD memory), a random access memory (RAM), a static random access memory (SRAM), a read-only memory (ROM), an electrically erasable programmable read only memory (EEPROM), a programmable read only memory (PROM), a magnetic memory, a magnetic disk, and an optical disk.

According to an exemplary embodiment of the present invention, the storage unit 160 may store a threshold variation or a threshold humidity value for the control of the display unit 170.

The display unit 170 displays information processed in the portable device 100. For example, the display unit 170 may display information corresponding to an application, program or service under operation along with a user interface (UI) or graphic user interface (GUI).

The display unit 170 may include at least one of a liquid crystal display (LCD), a thin film transistor-liquid crystal display (TFT LCD), an organic light-emitting diode (OLED), a flexible display and a 3D display.

The display unit 170 forms a mutually layered structure with the input unit 120 and the sensor unit 140, and may operate as a touch screen. At this time, the display unit 170, which operates as a touch screen, may also perform a function of an input device.

According to an exemplary embodiment of the present invention, the display unit 170 may turn on or off the power based on the surrounding humidity level of the portable device according to the control of the controller 150.

It should be noted that the components illustrated in FIG. 1 are not essential, and thus the portable terminal 100 may be implemented to include more or less components.

Figure 4:
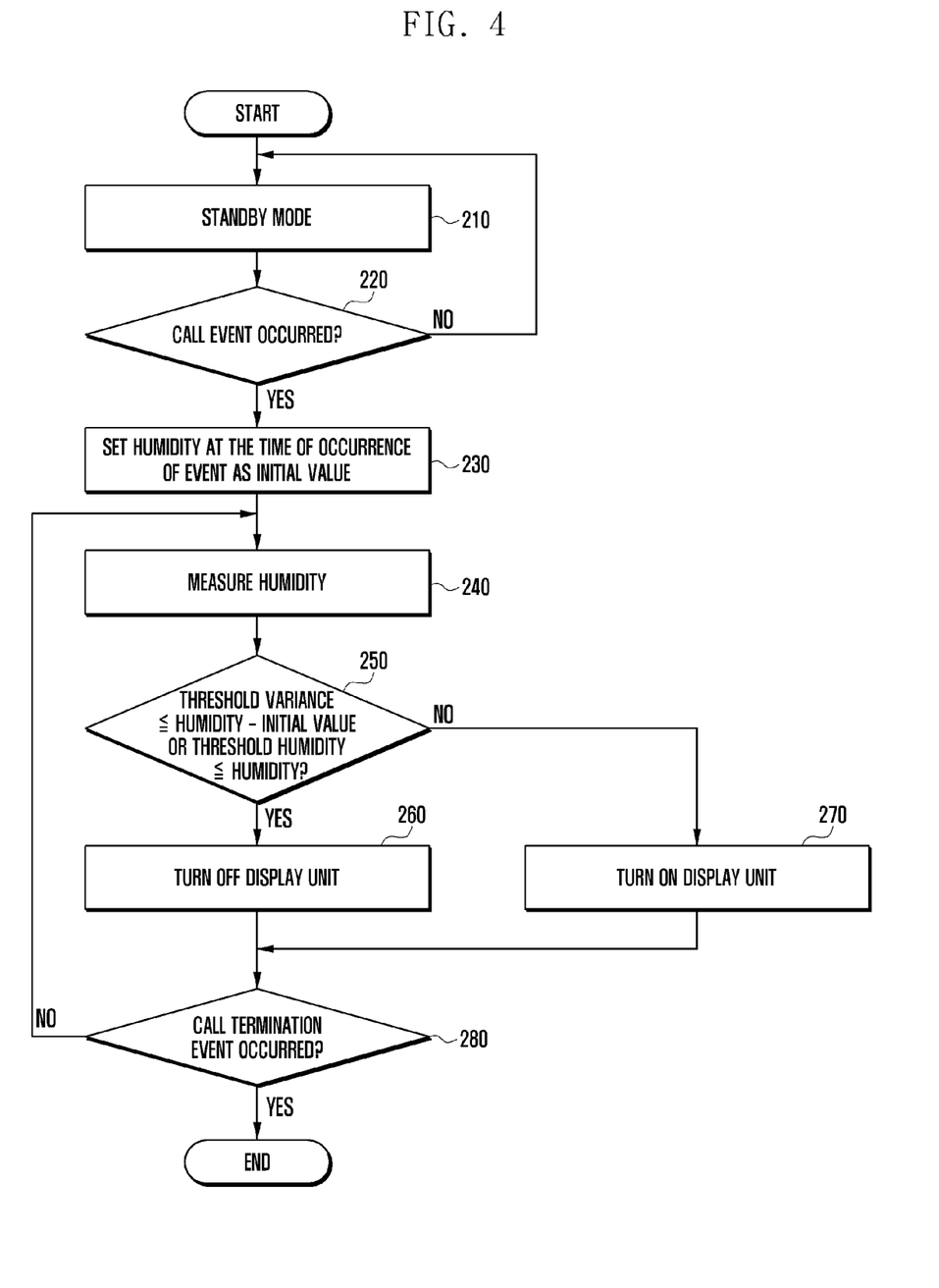
FIG. 4 is a flowchart illustrating a method of controlling a portable terminal according to an exemplary embodiment of the present invention.

FIG. 4 is a flowchart illustrating a method of controlling a portable terminal according to an exemplary embodiment of the present invention.

At step (210), the controller 150 may operate at a standby mode or may be operating a particular application, program or service during the standby state.

In the standby state, the controller 150 may control the display unit 170 to display a corresponding screen in the standby state, thus the display unit 170 may be active or on state. That is, the screen displayed in the display unit 170 may be a standby screen and an application driving screen, and in case the application is an application for performing a call, the displayed screen may be displaying one of a call record, a phone number list, and a dial screen.

Next, the controller 150 determines whether a call event has occurred (220).

The call event may occur by a reception of a call responsive to a call request or an input for a call request to another party. In case a call is received through the communication unit 110 or an input corresponding to a call request is sensed through the input unit 120, the controller 150 may determine that a call event has occurred.

The controller 150 may obtain information for call connection related information along with an occurrence of a call event. For example, the controller 150 may obtain a phone number, location information, base station information, etc. of a calling or called party. To this end, the controller 150 may obtain the information from the call received through the communication unit 110 or user's input through the input unit 120.

When a call event occurs, the controller 150 may set the detected humidity level as the initial value when the call event occurs (230).

The occurrence of a call event may be a state right before a user holds the portable device 100 near the ear area to perform a call connection. That is, at the point when the call event occurs, the portable device 100 may be in a state in which the portable device 100 has not neared the user's head portion area in close proximity to perform a call connection. At this time, the user may be reading the information displayed in the display unit 170. Thus, the controller 150 may control to maintain the power of the display unit 170 at a power-on state and continually display the screen currently being displayed.

Figure 6:
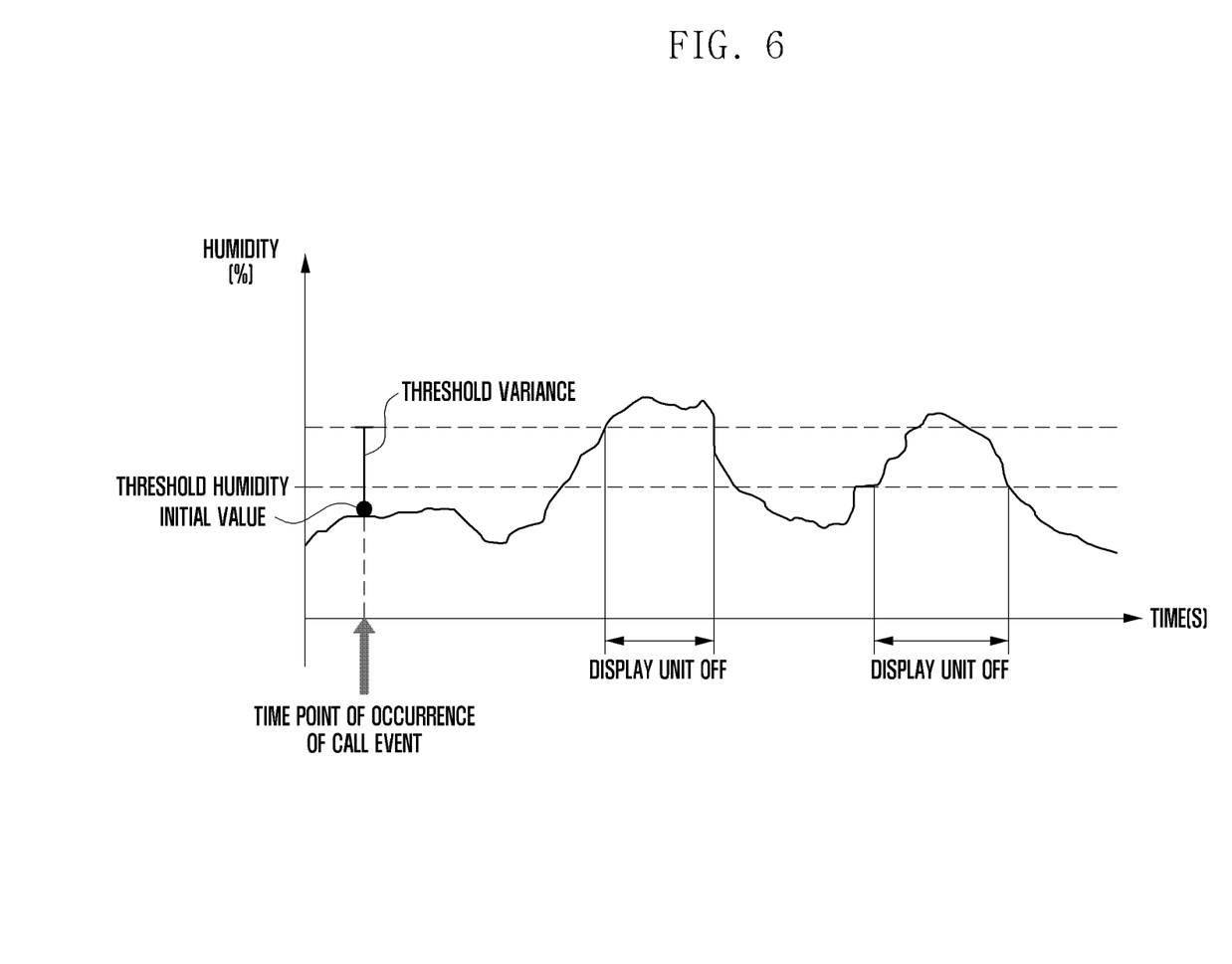
FIG. 6 is a graph illustrating an example of controlling a portable device based on a change of humidity as time passes.

When the call event occurs, the controller 150 transmits a control signal for operating the humidity sensor 144 to the humidity sensor 144. The humidity sensor 144 measures the humidity around the humidity sensor 144 according to the control signal of the controller 150. The humidity sensor 144 may first measure the humidity at the initial point when the call event occurs. Here, the humidity sensor 144 may generate a data signal including the measured humidity information, and transmit the data signal to the controller 150. Accordingly, the controller 150 may obtain the humidity at the time of the occurrence of the call event based on the data signal transmitted from the humidity sensor 144. Then, the controller 150 sets the obtained humidity at the time of the occurrence of the call event as the initial value, as shown in FIG. 6. The initial value is a criterion value for determining whether the humidity around the humidity sensor 144 has changed during a call attempt or connection after the occurrence of the call event.

The controller 150 may temporarily store the set initial value in the storage unit 160. Further, the controller 150 may control the display unit 170 to display the measured humidity.

In addition, the controller 150 may perform an arbitrary operation according to the occurrence of the call event. For example, the controller 150 may control each component of the portable device 100 to output a call receiving sound or a call transmitting sound or to display a screen indicating that a call is being performed.

When the call event does not occur, the controller 150 may return to the standby mode and repeat the above process.

Otherwise, the controller 150 measures a variation in the humidity level from when the call event occurs and when the portable device nears the user's head portion area to perform the call connection (240). Here, the controller 150 may establish a call connection by repeatedly exchanging wireless signals with the base station or the calling party through the communication unit 110.

The controller 150 may transmit a control signal for measuring the humidity during a call connection to the humidity sensor 144. To this end, the controller 150 may generate a control signal according to a preset time interval, and transmit the generated control signal to the humidity sensor 144. In response, the humidity sensor 144 measures the humidity level around the humidity sensor 144 according to the preset time interval.

Figure 5:
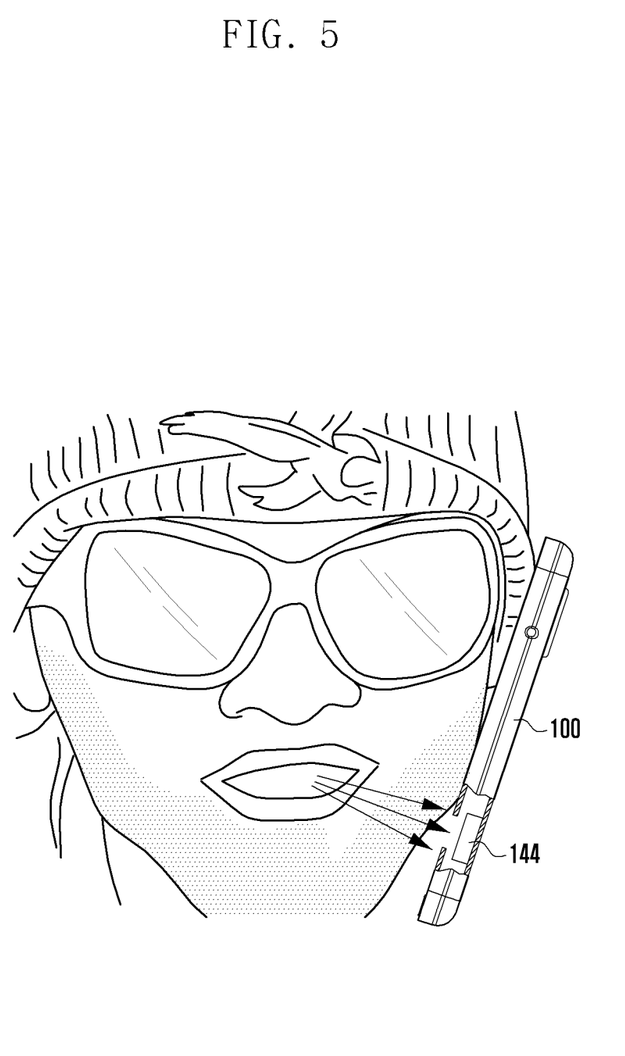
FIG. 5 illustrates a case in which a humidity sensor, which is included in a portable terminal, approaches a user's face according an exemplary embodiment of the present invention.

According to an exemplary embodiment of the present invention, the humidity sensor 144 may be positioned adjacent to the voice input unit 120 of the portable device 100. That is, as illustrated in FIG. 5, the humidity sensor 144 may be positioned in a portion where the user inputs a voice during a call connection. In case user positions the portable device 100 near the user's facial area, particularly to his or her ear, to perform a call, the user's breath may be discharged toward the humidity sensor 144. The user's breath contains moisture, and thus in case the portable device 100 approaches user's face or a voice is inputted from user through the voice input unit 120, the humidity level around the humidity sensor 144 increases from an earlier humidity level at the time of the occurrence of the call event.

The humidity sensor 144 may measure the variation in the humidity level according to the preset time interval under the control of the controller 150. The controller 150 may receive a data signal containing the humidity level information measured by the sensor unit 144. The variation in the humidity level, which is periodically measured by the humidity sensor 144, may be graphically illustrated, as illustrated in FIG. 6.

Next, the controller 150 determines whether the humidity level variation is the same as or greater than a threshold variation value or level (250).

The humidity variation represents a difference between the humidity measured at an arbitrary time and the initial value, i.e., the humidity at the time when the call event occurs. The humidity variation may be shown in Equation 1 below.

Humidity variation=measured humidity−initial value [Equation 1]

Here, the initial value may be humidity at the time of the occurrence of the call event.

When the portable device 100 nears the user's face, the humidity level around the humidity sensor 144 changes and thus the humidity variation occurs. In contrast, in case the humidity sensor 144 is not positioned near user's face, the humidity level around the humidity sensor 144 would be less or would not change.

Accordingly, the threshold variation level indicates whether the portable device 100 is placed near the user's facial or head portion area.

When the humidity variation, which is the difference between the measured humidity level is greater than or equal a predetermined threshold variation value, the controller 150 may determine that the portable device 100 is placed near the user's facial area which in turn indicates that the user is performing a call. In contrast, when the humidity variation is less than the threshold variation value, the controller 150 may determine that the portable device 100 is not near the user's face to conduct a call, thus determine that the user is not performing a call or is looking at the display unit 170.

The threshold variation may be preset at the time of manufacturing the portable device 100 or by the user's input. The threshold variation may be minutely determined based on the experimental data which is obtained by measuring the humidity change that occurs in the humidity sensor when user performs a call.

The humidity sensor 144 periodically measures the humidity around the humidity sensor 144 while performing a call. In case the portable device approaches the user's face, the humidity around the humidity sensor 144 increases. In contrast, in case the humidity sensor 144 is not positioned near the user's facial area, the humidity around the humidity sensor 144 may slightly change from the humidity at the time of the occurrence of the call event.

Accordingly, on case the humidity variation is greater than or equal to the threshold variation value, the controller 150 turns off the display unit 170 (260). That is, the controller 150 may determine that the portable device 100 has approached the user's face as illustrated in FIG. 5 when the difference is greater or the same as the preset threshold value. In such a case, the user is generally not looking at the display unit 170. Hence, the controller may control the power of the display unit 170 so that the display unit 170 is turned off.

Referring to FIG. 6, the humidity is periodically measured according to the time during a call connection, and when the humidity variation is larger than or the same as the threshold variation value, the display unit 170 is continuously turned off.

As it can be appreciated as above, the method of controlling the portable device 100 according to the present invention may prevent unnecessary power consumption by turning off the display unit 170 when user positions the portable device 100 near his face and speaks during a call connection.

When the display unit 170 is turned off, the controller 150 may control the portable device 100 to enter a locking mode, a power-saving mode or a slip mode. Further, the controller 150 may output an alarm or a vibration, etc. to indicate that the display unit 170 has been turned off.

In contrast, in case the humidity variation is less than the threshold variation value, the controller 150 may turn on the display unit 170 (270). That is, the controller 150 may determine that the portable device 100 has not approached the user's face. In such a case, user may be looking at the display unit 170. Hence, the controller 150 may control the power of the display unit so that the display unit 170 is turned on.

Thereafter, the controller 150 may determine whether a call termination event has occurred (280).

When a wireless signal for call termination is received through the communication unit 110 or an input for call termination is sensed through the input unit 120, the controller 150 determines that the call termination event has occurred.

When the call termination event occurs, the controller 150 terminates the control operation of the portable device 100 according to the present invention.

In contrast, when the call termination event does not occur, the controller 150 may return to the step of measuring the humidity, and repeat the above process.

Some examples of controlling on/off of the display unit 170 according to a humidity change during a call connection based on the threshold variance or the threshold humidity have been described, but the present invention is not limited to these examples, and the present invention may be modified in various manners within the scope of the technical concept of the present invention.

Figure 7:
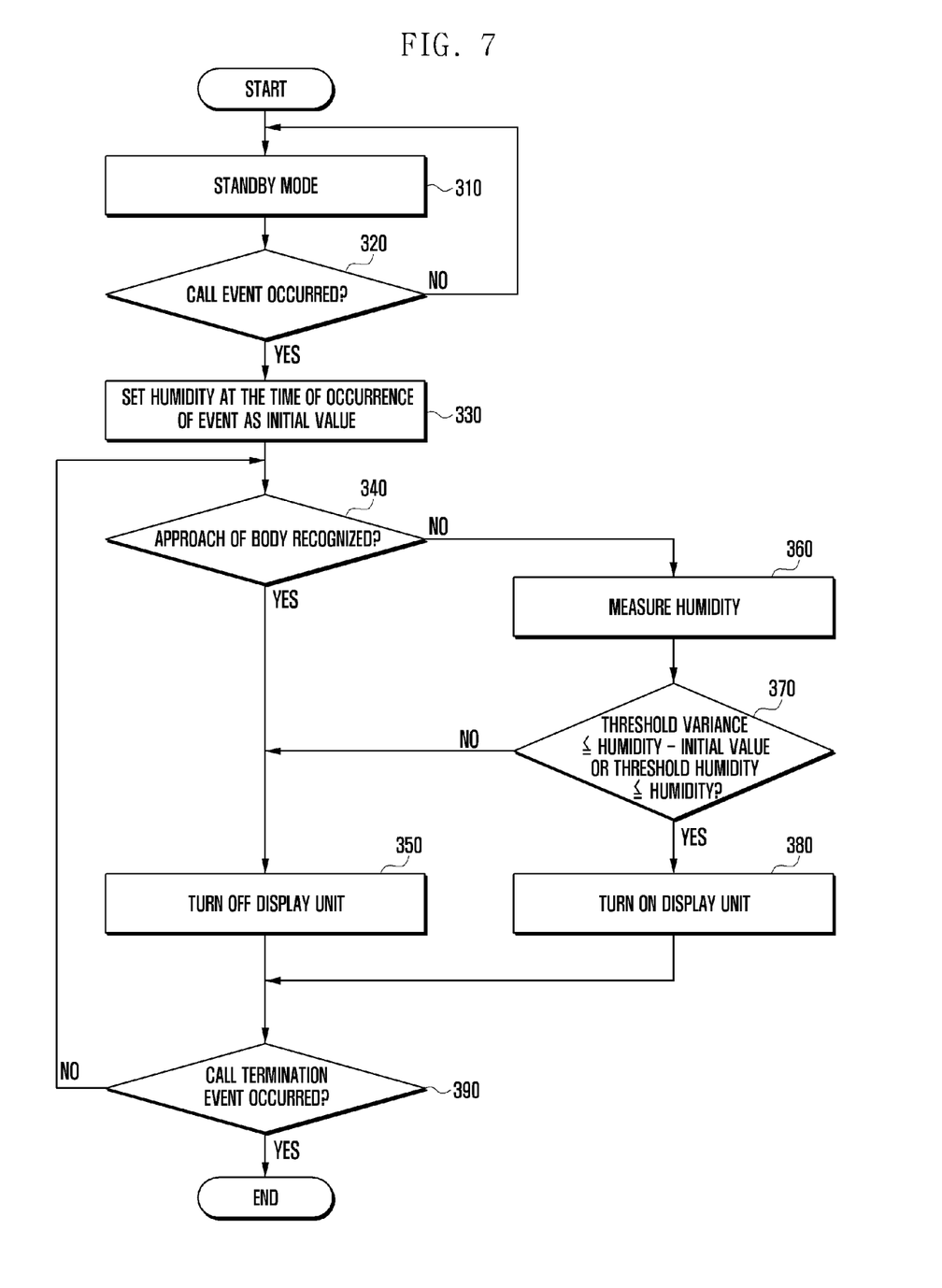
FIG. 7 is a flowchart illustrating a method of controlling a portable device according to another exemplary embodiment of the present invention.

FIG. 7 is a flowchart illustrating a method of controlling a portable device according to another exemplary embodiment of the present invention.

At step 310, the controller 150 may be operating in a standby mode or be operating an arbitrary application, program or service in the standby mode. Here, the arbitrary application may be an application for a call performance.

In the standby state, the display unit 170 may be at a power-on state. That is, the controller 150 may control the display unit 170 to display a corresponding screen in the standby state. The screen displayed in the display unit 170 may be a standby screen or an application operating screen, and in case the application is an application for a call performance, the displayed screen may be one of a call record, a phone number list and a dial screen.

Next, the controller 150 determines whether a call event has occurred (320).

When the call event occurs, the controller 150 may set the humidity level at the time of the occurrence of the event as the initial value (330).

Note that the portable device 100 may not near the user's ear area at the time of the occurrence of the call event. At this time, user may be looking at the information displayed in the display unit 170 to initiate a call or determine an original of the calling party. Hence, the controller 150 may control to maintain the power state of the display unit 170 to be on state and continually display the screen currently being displayed.

When the call event occurs, the controller 150 transmits a control signal for operating the humidity sensor 144 to the humidity sensor 144. In response, the humidity sensor 144 measures the humidity around the humidity sensor 144, and the humidity sensor 144 may first measure the humidity level at the time of the occurrence of the call event. Here, the humidity sensor 144 may generate a data signal including the measured humidity information and transmit the generated data signal to the controller 150.

The controller 150 sets the humidity level at the time of the occurrence of the obtained call event as the initial value. The initial value is a criterion value for determining whether the humidity around the humidity sensor 144 has been changed and how much the humidity has changed during a call after the occurrence of the call event.

The controller 150 may temporarily store the set initial value in the storage unit 160. Further, the controller 150 may control the display unit 170 to display the measured humidity.

In contrast, when the call event does not occur, the controller 150 may return to the standby mode and repeat the above process.

Next, the controller 150 determines whether the portable device 100 has approached the user's facial or head portion area (340).

The controller 150 may transmit a control signal for determining whether the portable device 100 has approached the user's facial area, to the proximity sensor 143. Here, the controller 150 may generate a control signal and transmit the generated control signal to the proximity sensor 143 according to a preset period. In response, the proximity sensor 143 determines whether the user's body has approached the portable device 100 according to a preset period set by the controller 150.

Figure 8:
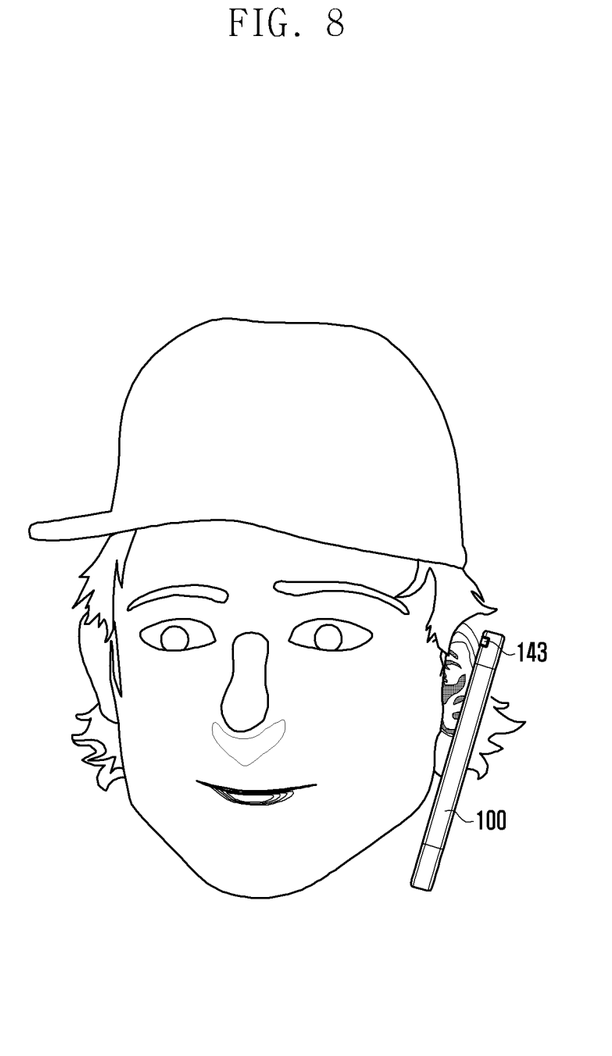
FIG. 8 illustrates a case in which a proximity sensor, which is included in the portable device approaches a user's facial area according an exemplary embodiment of the present invention.

According to an exemplary embodiment of the present invention, the proximity sensor 143 may be arranged on the front surface of the portable device 100 as illustrated in FIG. 8. That is, when user positions the portable device 100 near his face during a call connection, the proximity sensor 143 is positioned at the front surface of the portable device facing the user's face. As such, the proximity sensor 143 senses whether the user's face (particularly, the cheek or the ear) has approached the portable device 100 during a call. When it is sensed that the user's body part has approached the portable device 100, the proximity sensor 143 generates a corresponding control signal and transmits the signal to the controller 150.

The controller 150 determines whether the user's body has approached the portable device 100 based on the control signal transmitted from the proximity sensor 143.

When the approach of the user's body is sensed, the controller 150 turns off the display unit 170 (350).

When it is sensed that the portable device 100 is near the head portion or facial area, the controller 150 may determine that user is not looking at the display unit 170 but performing a call connection as illustrated in FIG. 8. Hence, the controller 150 may control the power of the display unit 170 so that the display unit 170 is turned off in order to reduce the power consumption.

As the display unit 170 is turned off, the controller 150 may control the portable device 100 to enter a locking mode, a power-saving mode or a slip mode. Further, the controller 150 may output an alarm or a vibration, etc. for indicating that the display unit 170 has been turned off.

In contrast, in case the approach to the user's head portion area has not been sensed, i.e., when the user is looking at the display unit 170 or not performing a call or the proximity sensor 143 malfunctions, the controller 150 measures the humidity level (360) to selectively turn on and off the display unit as explained earlier. In an alternate embodiment, the order of sensor can be interchanged so that if the humidity level malfunctions, the controller 150 can activate the proximity sensor 143 to detect whether the portable terminal nears the user's facial area. When the proximity sensor 143 malfunctions, the controller 150 may transmit a control signal for measuring the humidity level to the humidity sensor 144. Here, the controller 150 may generate a control signal according to a preset period, and transmit the generated control signal to the humidity sensor 144. The humidity sensor 144 measures the humidity level around the humidity sensor according to a preset period by the control of the controller 150.

According to an exemplary embodiment of the present invention, the humidity sensor 144 may be positioned near the voice input unit 120 of the portable device 100. In case the user positions the portable device 100 near his face area, particularly, the ear portion, to perform a call, the breath of the user may be discharged in a direction of the humidity sensor 144. The user's breath contains moisture, and thus when the portable device 100 approaches the user's face or a voice is inputted from user through the voice input unit 120, the humidity level around the humidity sensor 144 becomes larger than the humidity at the time of the occurrence of the call event.

The sensor unit 144 may measure the moisture according to a preset period by the control of the controller 150. The humidity, which is periodically measured by the humidity sensor 144, may be shown as a graph as illustrated in FIG. 6. The controller 150 may receive a data signal including humidity information measured from the sensor unit 144.

Next, the controller 150 determines whether the humidity variance is larger than or the same as the threshold variance, or the humidity is larger than or the same as the threshold humidity (370).

The humidity variance means a difference between the humidity level measured at an arbitrary time point and the initial value, which is the humidity level at the time of the occurrence of the call event. The humidity variance may be obtained in a manner that is shown in Equation 2 below.

Humidity variance=measured humidity−initial value [Equation 2]

In case the portable device 100 approaches the user's facial or head portion area, the humidity level around the humidity sensor 144 increases, and thus the humidity variance gets larger. In contrast, in case the humidity sensor 144 is not positioned near the user's face, the humidity variation level around the humidity sensor 144 is smaller due to absence of moisture from the user's breath. As illustrated in FIG. 6, the threshold variance may be expressed as a difference between the measured humidity and the initial value.

When the humidity variance occurs, which is the difference between the humidity measured at an arbitrary time point and the initial value, is larger than or the same as the threshold value, the controller 150 may determine that the portable device 100 has approached the user's facial area, and thus determine that the user is performing a call. In contrast, when the humidity variance is smaller than the threshold value, the controller 150 may determine that the portable device 100 has not approached the user's face, and thereby determine that the user is not performing a call or is looking at the display unit 170.

The threshold value may be set in advance at the time of manufacturing the portable terminal 100 or by the user's input. The threshold value may be minutely determined based on the experimental data which is obtained by measuring the change of the humidity which occurs in the humidity sensor 144 while user performs a call.

Accordingly, in case the humidity variation is larger than or the same as the threshold value, the controller 150 turns off the display unit 170 (350).

In contrast, in case the humidity variation is smaller than the threshold variation, the controller 150 turns on the display unit 170 (380).

Thereafter, the controller 150 may determine whether the call termination event has occurred (390).

When a wireless signal for call termination is received through the communication unit 110 or an input for call termination is sensed through the input unit 120, the controller 150 determines that a call termination event has occurred.

When the call termination event occurs, the controller 150 terminates the control operation of the portable device 100 according to the present invention.

Further, when the call termination event does not occur, the controller 150 may return to the step 340.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of controlling a portable device having a humidity sensor, comprising:
setting, if a call event is detected, a humidity level at the time of the occurrence of the call event as an initial value;
measuring a variation of the humidity level around the portable device;
comparing the variation with a preset threshold value; and
selectively controlling on/off of a display unit of the portable device according to a comparison outcome.

2. The method of claim 1, wherein the variation is measured according to a preset time interval during the call event.

3. The method of claim 1, wherein the comparing step comprises determining whether the measured variation is greater than or equal to the preset threshold value.

4. The method of claim 1, wherein the controlling step comprises:
turning off the display unit when the variation is greater than or equal to the preset threshold value; and
turning on the display unit when the variation is less than the preset threshold value.

5. The method of claim 1, further comprising:
determining whether the portable device nears a head portion area using a proximity sensor.

6. The method of claim 5, wherein the controlling step comprises:
turning off the display unit when it is determined, via the proximity sensor, that the portable device is placed near the head portion area.

7. The method of claim 1, wherein the humidity sensor is installed adjacent to a voice input unit of the portable device.

8. The method of claim 7, further comprising:
determining whether the proximity senor is operational, and if not, selectively controlling on/off of the display unit of the portable device according to the comparison outcome using the humidity sensor.

9. A portable device having a display unit, comprising:
a humidity sensor configured to measure a variation of a humidity level around the portable device; and
a controller configured to set, if a call event is detected, the humidity level at the time of the occurrence of the call event as an initial value, to measure a variation of the humidity level around the portable device from the initial value, to compare the variation with a preset threshold value, and to selectively control on/off of the display unit according to comparison outcome.

10. The portable device of claim 9, wherein the controller further configured to determines whether the variation is greater than or equal to the preset threshold value.

11. The portable device of claim 10, wherein the controller further configured to controls the display unit to be turned off when the variation is greater or equal the present threshold value and turned on when the variation is less than the preset threshold value.

12. The portable device of claim 9, further comprising:
a proximity sensor for sensing when the portable device nears a head portion area,
wherein the controller further configured to determines whether the portable device nears the head portion area using the proximity sensor and controls the humidity sensor to measure the humidity level around the portable device when there is no detection using the proximity sensor.

13. The portable device of claim 12, wherein the controller further configured to controls the display unit to be turned off when it is determined that the portable device nears the head portion area.

14. The portable device of claim 9, further comprising:
a voice input unit; and
a case having an opening for an inflow of external air, the case surrounding the voice input unit,
wherein the humidity sensor is installed adjacent to the voice input unit inside of the case.

15. The portable device of claim 14, further comprising:
a wall disposed between the humidity sensor and the voice input unit.

16. The portable device of claim 14, wherein the opening of the case is shared by the humidity sensor and the voice input unit.

* * * * *

UNITED STATES PATENT AND TRADEMARK OFFICE
CERTIFICATE OF CORRECTION

PATENT NO.       : 8,983,444 B2
APPLICATION NO.  : 13/869282
DATED            : March 17, 2015
INVENTOR(S)      : Sangwon Yun It is certified that error appears in the above-identified patent and that said Letters Patent is hereby corrected as shown below:

In the Claims

Column 12, Claim 8, Line 66 should read as follows:
--...the proximity sensor is...--

Column 13, Claim 10, Line 14 should read as follows:
--...configured to determine whether...--

Column 13, Claim 11, Line 17 should read as follows:
--...configured to control the...--

Column 13, Claim 11, Line 18 should read as follows:
--...greater than or equal to the...--

Column 14, Claim 12, Lines 1-2 should read as follows:
--...configured to determine whether...--

Column 14, Claim 13, Line 8 should read as follows:
--...configured to control the...--

Signed and Sealed this
Ninth Day of June, 2015

Michelle K. Lee
*Director of the United States Patent and Trademark Office*